United States Patent [19]

Leveque et al.

[11] 4,369,166

[45] Jan. 18, 1983

[54] PURIFICATION OF SOLUTIONS OF GALLIUM VALUES BY LIQUID/LIQUID EXTRACTION

[75] Inventors: Alain Leveque; Michel Triollier, both of Paris, France

[73] Assignee: Rhone-Poulenc Industries, Paris, France

[21] Appl. No.: 326,177

[22] Filed: Nov. 30, 1981

[30] Foreign Application Priority Data

Dec. 5, 1980 [FR] France ............................. 80 25830

[51] Int. Cl.$^3$ ............................................. C01G 15/00
[52] U.S. Cl. .............................. 423/112; 75/101 BE; 423/139
[58] Field of Search ................... 423/112; 75/101 BE

[56] References Cited

U.S. PATENT DOCUMENTS

| | | | |
|---|---|---|---|
| 3,971,843 | 7/1976 | Helgorsky et al. | 423/112 |
| 4,169,130 | 9/1979 | Helgorsky et al. | 423/112 |
| 4,193,968 | 3/1980 | Sullivan et al. | 423/112 |
| 4,241,029 | 12/1980 | Helgorsy et al. | 423/112 |

OTHER PUBLICATIONS

Ivanova et al., "Chemical Absts.", vol. 80, 1974, #87881m.

*Primary Examiner*—Herbert T. Carter
*Attorney, Agent, or Firm*—Burns, Doane, Swecker & Mathis

[57] ABSTRACT

Highly pure (>99.99%) aqueous solutions of gallium chloride are obtained by (i) liquid/liquid extracting an aqueous hydrochloric acid solution of gallium values with an organic phase which comprises an alcohol extractant, (ii) separating the organic phase from the aqueous phase, (iii) selectively washing said organic phase by intimately contacting same with water or with an aqueous solution of hydrochloric acid, (iv) next transferring the purified gallium values from said organic phase into an aqueous solution thereof, and (v) thence separating said organic phase from said resulting aqueous phase, whereby said aqueous phase comprises pure gallium chloride.

12 Claims, 1 Drawing Figure

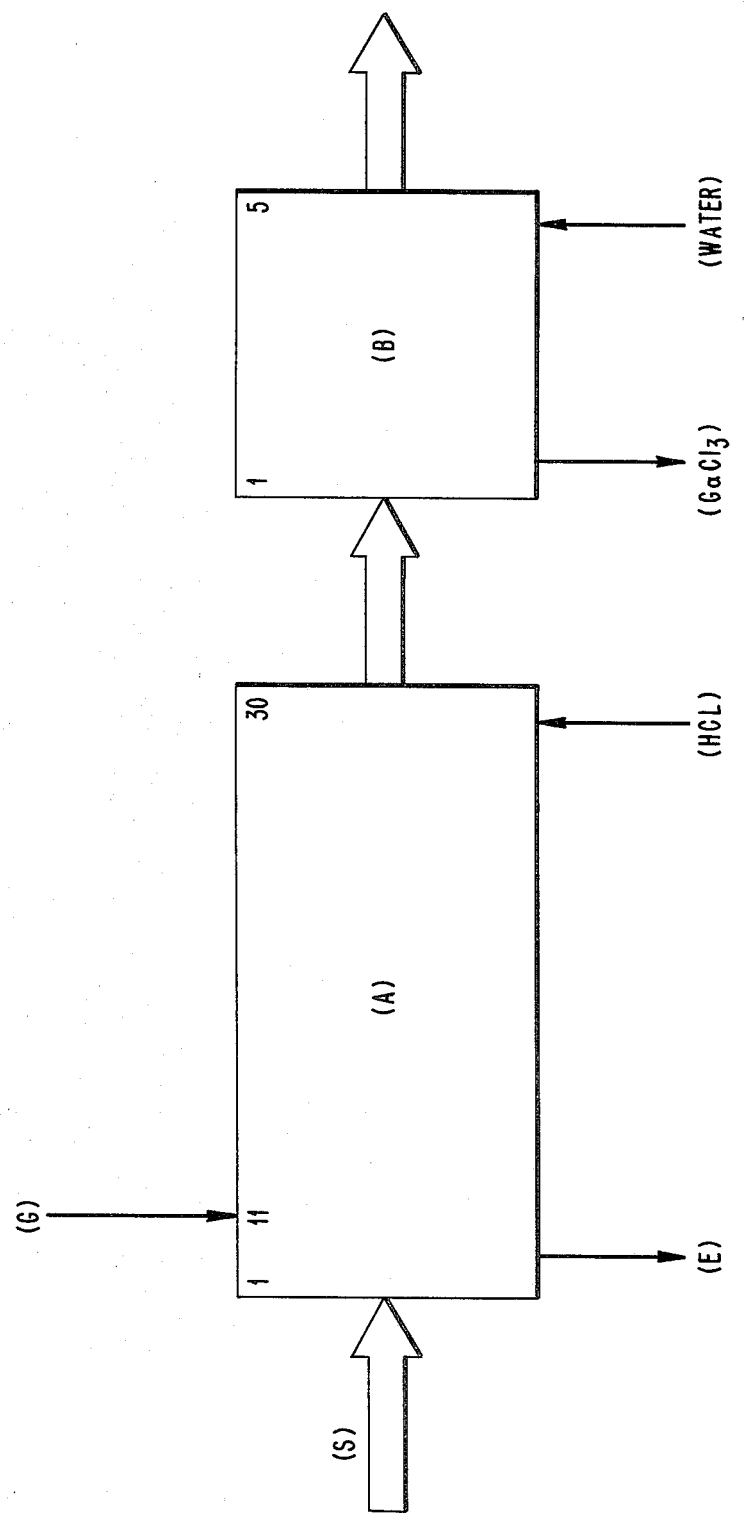

PURIFICATION OF SOLUTIONS OF GALLIUM VALUES BY LIQUID/LIQUID EXTRACTION

CROSS-REFERENCE TO RELATED APPLICATIONS

Leveque et al. copending applications, Ser. No. 326,178 and Ser. No. 326,166, both filed concurrently herewith, both assigned to the assignee hereof, and both hereby expressly incorporated by reference. Cf. Helgorsky et al. U.S. Pat. Nos. 3,971,843, 4,169,130, and 4,241,029.

BACKGROUND OF THE INVENTION

1. Field of the Invention

The present invention relates to the purification of solutions of gallium, and, more especially, to such purification as to obtain a solution of gallium chloride very high in purity.

The invention more particularly relates to a process for the purification of aqueous hydrochloric acid solutions of gallium in the presence of various elements, notably of iron in ferric state, by liquid/liquid extraction utilizing an alcohol extractant.

2. Description of the Prior Art

The various applications to which gallium is put, in particular in the field of electronics, make it necessary to obtain the gallium in a very high degree of purity. Although the separation of gallium from various metal cations using various solvents has heretofore been achieved, the separation of gallium from various elements, and in particular from iron in ferric state, has hitherto proved unattainable without prior reduction of the iron to the ferrous state [*Chemical Abstracts*, 92, 9435c (1979)].

SUMMARY OF THE INVENTION

Overcoming the technical presumption that it is impossible, in particular, to separate gallium from iron in the ferric state by solvent extraction, there is hereby provided as a major object of the present invention a novel process for the purification of solutions of gallium, which process features markedly enhanced and excellent purification of the aforesaid solutions in the presence of various elements, and in particular of iron in the ferric state. The subject process effects the selective extraction of gallium from a solution containing the various elements, and in particular iron in the ferric state, using alcohols as the organic extractant.

BRIEF DESCRIPTION OF THE DRAWING

The FIGURE of Drawing is a schematic/diagrammatic illustration of extraction apparatus suitable for carrying out the process according to this invention.

DETAILED DESCRIPTION OF THE INVENTION

More particularly according to this invention, the subject process features the purification of an aqueous hydrochloric acid solution of gallium by liquid/liquid extraction utilizing an organic extractant, and wherein (i) the aqueous hydrochloric acid solution of gallium is contacted with an organic phase containing, as the extractant, an alcohol which is substantially insoluble in water, (ii) the organic phase is next separated from the aqueous phase, with the gallium being selectively extracted into the organic phase, (iii) the organic phase is then contacted with water or a solution of hydrochloric acid in order to effect a selective washing of this organic phase, (iv) the purified gallium is then transferred from the organic phase into an aqueous solution and, finally, (v) the organic phase is separated from the resulting aqueous phase, with the aqueous phase containing the pure gallium chloride.

In accordance with the process of the invention, the aqueous hydrochloric acid solution of gallium is contacted with an organic phase containing a gallium extraction agent which is insoluble in water and, if appropriate, an inert diluent, such that the gallium is selectively extracted into the organic phase.

The aqueous hydrochloric acid solutions of gallium which can be purified consistent with this invention, for the purpose of obtaining solutions very high in purity, can emanate from very diverse origins. Same are characterized by a free HCl acidity of from 1 to about 8 N, and preferably from 2 to 6 N. Same can also contain mixtures of hydrochloric acid and other acids, such as sulfuric acid or perchloric acid.

The nature and amount of the impurities contained in these solutions can be very varied and the impurities can consist of various metal cations from the Periodic Table of elements, notably those of calcium, magnesium, aluminum, vanadium, chromium, copper, manganese, sodium, zinc, cobalt, nickel, lead cadmium, indium, barium, strontium, potassium, titanium, lanthanides, yttrium, arsenic, iron (particularly in the ferric state), phosphorus, tin, boron, and the like.

Furthermore, the concentration of gallium in these solutions can also vary over very wide limits, for example, from about 500 mg/liter to about 300 g/liter, this example being given purely by way of illustration.

The alcohols which can be used in accordance with the process of the invention are those which preferably contain from about 4 to about 10 carbon atoms, such that same are substantially immiscible in water and sufficiently fluid to prevent or avoid processing problems. Exemplary of such alcohols are pentanol, n-butanol, isobutanol, cyclohexanol, n-hexan-1-ol, 2-ethylhexanol, n-heptanol, n-octanol, isooctanol, n-decanol and isodecanol. Pure 2-ethylhexanol, namely, undiluted 2-ethylhexanol, is preferably used.

The proportion or amount of the alcoholic extractant comprising the organic phase is not critical and also can vary over wide limits, but advantageously ranges from 10 to 100% by volume, relative to the organic phase. If their viscosity allows, the alcohols are preferably used undiluted such as to maintain the volumes of liquid, and hence the size of the apparatus, to a minimum.

If appropriate, the organic phase can contain a diluent which can be selected, in particular, and as is well known to those skilled in this art, from among the aliphatic compounds such as heptane, dodecane and hexane; petroleum cuts of the kerosene type; aromatic compounds such as, for example, benzene, toluene, ethylbenzene, xylene and cuts of the Solvesso type (registered trademark of Exxon), and, finally, halogen derivatives of these compounds, such as, for example chloroform and carbon tetrachloride.

The organic phase is separated from the aqueous phase, with the gallium being selectively extracted into the organic phase; the organic phase is then brought into contact with water or a hydrochloric acid solution in order to carry out a selective washing operation on this organic phase by removing the remaining impurities. The concentration of the hydrochloric acid solution is advantageously less than about 6 M.

The aqueous washing solution which results, which contains the impurities and a small amount of gallium, can optionally be recycled with the initial aqueous hydrochloric acid solution of gallium in order to repeat the purification operation.

The purified gallium is then transferred from the organic phase into an aqueous solution by bringing the organic phase into contact with water, and, finally, the organic phase is separated from the resulting aqueous phase, with said aqueous phase containing pure gallium chloride.

The purity of the aqueous solution of gallium thus obtained is in excess of 99.99%.

The steps of extraction, selective washing and recovery of the gallium can be carried out in conventional apparatus used for liquid/liquid extractions.

Such apparatus typically comprises several stages of mixer/decanter systems or of packed and/or agitated columns, arranged such as to carry out the operations of extraction, selective washing and recovery of the extracted element into the aqueous phase.

In order to further illustrate the present invention and the advantages thereof, the following specific example is given, it being understood that same is intended only as illustrative and in nowise limitative.

EXAMPLE

A solution (G) of gallium chloride, having the following composition:

| | |
|---|---|
| Ga: | 40 g/liter |
| HCl: | 5.6 N |
| Al: | 5 mg/liter |
| Na: | 3 mg/liter |
| $Fe^{3+}$: | 800 mg/liter |
| Ca: | 10 mg/liter |
| Mg: | 2 mg/liter |
| Cr: | 1 mg/liter |
| V: | 1 mg/liter |
| Cu: | 0.4 mg/liter |
| Mn: | 1 mg/liter |
| Zn: | 2 mg/liter | was purified.

The foregoing solution was intimately contacted with an organic phase consisting of 2-ethylhexanol (S). Such contacting was carried out, as illustrated in the accompanying FIGURE of Drawing, in a multi-stage liquid/liquid extraction apparatus (A) operating countercurrently and comprising 30 theoretical stages. The 2-ethylhexanol was charged into the apparatus at stage 1 at a flow rate of 100 ml/hour. The solution of gallium was introduced into the apparatus at stage 11 at a flow rate of 145 ml/hour. The selective washing was carried out by introducing a 0.5 N hydrochloric acid solution (HCl) at stage 30 at a flow rate of 45 ml/hour.

The exhausted aqueous phase (E) exiting stage 1 contained the impurities and less than 100 mg/liter of gallium, which corresponds to a degree of extraction of more than 99.5%.

The 2-ethylhexanol enriched in gallium, exiting the apparatus A, was charged into a 5-stage apparatus B in which the gallium chloride (GaCl₃) was recovered in aqueous solution by bringing (S) into contact with water (water), countercurrently, at a flow rate of 95 ml/hour. This provided a solution of GaCl₃ having the following composition:

| | | |
|---|---|---|
| Ga | : | 59.6 g/liter |
| Al | < | 0.2 mg/liter |
| Na | < | 0.05 mg/liter |
| Fe | < | 0.1 mg/liter |
| Ca | < | 0.05 mg/liter |
| Mg | < | 0.05 mg/liter |
| Cr | < | 0.1 mg/liter |
| Cu | < | 0.1 mg/liter |
| Mn | < | 0.05 mg/liter |
| Zn | < | 0.05 mg/liter |

The solution obtained thus had a purity in excess of 99.99%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification of an aqueous hydrochloric acid solution of gallium values by liquid/liquid extraction, comprising (i) liquid/liquid extracting an aqueous hydrochloric acid solution of gallium values with an organic phase which comprises an alcohol extractant, (ii) separating the organic phase from the aqueous phase, (iii) selectively washing said organic phase by intimately contacting same with water or with an aqueous solution of hydrochloric acid, (iv) next transferring the purified gallium values from said organic phase into an aqueous solution thereof, and (v) thence separating said organic phase from said resulting aqueous phase, whereby said aqueous phase comprises pure gallium chloride.

2. The process as defined by claim 1, said alcohol extractant being a hydrocarbinol having from 4 to 10 carbon atoms.

3. The process as defined by claim 2, said alcohol extractant being selected from the group consisting of pentanol, n-butanol, isobutanol, cyclohexanol, n-hexanol, 2-ethylhexanol, n-heptanol, n-octanol, isooctanol, n-decanol and isodecanol.

4. The process as defined by claim 3, said alcohol extractant comprising undiluted 2-ethylhexanol.

5. The process as defined by claim 1, said organic phase being (iii) selectively washed with a less than 6 M solution of hydrochloric acid.

6. The process as defined by claim 1, said starting aqueous hydrochloric acid solution of gallium having a free HCl acidity ranging from 1 to about 8 N.

7. The process as defined by claim 6, said starting solution having a free HCl acidity ranging from 2 to 6 N.

8. The process as defined by claim 6, said starting solution further comprising sulfuric acid or perchloric acid.

9. The process as defined by claim 1, said starting aqueous hydrochloric acid solution of gallium comprising at least one of the metal cations of calcium, magnesium, aluminum, vanadium, chromium, copper, manganese, sodium, zinc, cobalt, nickel, lead, cadmium, indium, barium, strontium, potassium, titanium, lanthanides, yytrium, arsenic, iron, phosphorus, tin and boron.

10. The process as defined by claim 9, the concentration of gallium in said starting solution ranging from about 500 mg/liter to about 300 g/liter.

11. The process as defined by claim 9, said starting solution comprising ferric iron.

12. The process as defined by claim 1, said organic phase comprising a diluent selected from the group consisting of heptane, dodecane, hexane, petroleum cut of kerosene type, benzene, toluene, ethylbenzene, xylene, cut of Solvesso type, chloroform and carbon tetrachloride.

* * * * *